.United States Patent [19]
Seltzer et al.

[11] 3,843,649
[45] Oct. 22, 1974

[54] S-TRIAZINE TETRACARBOXYLIC ACIDS AND DIANHYDRIDES

[75] Inventors: Raymond Seltzer, New City; David A. Gordon, Scarsdale, both of N.Y.

[73] Assignee: Ciba-Geigy Corporation, Greenburgh, N.Y.

[22] Filed: May 1, 1972

[21] Appl. No.: 248,838

[52] U.S. Cl. .................. 260/248 CS, 260/787 F
[51] Int. Cl. ........................................ C07d 55/50
[58] Field of Search .................. 260/248 CS, 249.5

[56] References Cited
UNITED STATES PATENTS
3,700,662   10/1972   Ishikawa et al. ............ 260/249.5 X

*Primary Examiner*—John M. Ford

[57] ABSTRACT s-Triazine tetracarboxylic acid having the formula

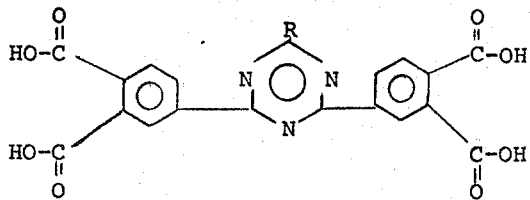

wherein
R is hydrogen, alkyl, aryl, amino, carboxyl, nitrogen heterocyclic or a diarylamino group, can be prepared by reacting a dihalo triazine such as 2-phenyl-4,6-dichloro-s-triazine with o-xylene and thereafter oxidizing the intermediate to yield the above acid. By dehydrating the acid a corresponding dianhydride is obtained. Such compounds are useful in preparing various polymers, as for example polyimides.

10 Claims, No Drawings

S-TRIAZINE TETRACARBOXYLIC ACIDS AND DIANHYDRIDES

DETAILED DISCLOSURE

This invention relates to novel s-triazine tetracarboxylic acids and their anhydrides. The acids can be represented by the formula:

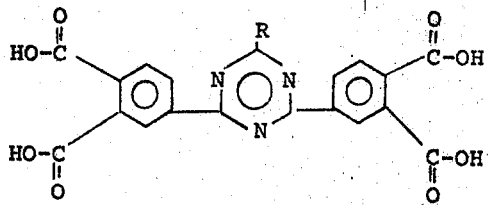

wherein
R is hydrogen, aryl, alkyl, carboxyl, amino, nitrogen heterocyclic or diarylamino group.

More specifically, the R group can be phenyl, naphthyl, biphenylyl, substituted aryl groups such as chlorophenyl, dichlorophenyl, chloronaphthyl, methoxyphenyl, carboxyphenyl and carboxyl, diphenylamino or dinaphthylamino group and the like.

The R group can also be a heterocyclic group containing nitrogen atoms in the ring. Illustrative examples of such heterocyclic group are:

a. A group having the structure

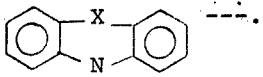

where X is as defined below. When X is a covalent bond the resulting group would be a 9-carbazolyl; when X is oxygen the group would be a 10-phenoxazinyl and when X is sulfur the group would be a 10-phenothiazinyl, b. a 1-indolyl group having the structure

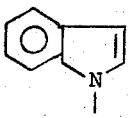

c. a 2-isoindolyl group having the structure

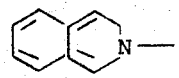

d. a 1-imidazolyl having the structure

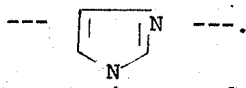

e. a 1-pyrroloyl having the structure

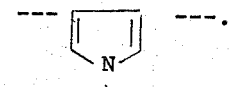

By alkyl group referred to above is meant a straight or branched chain alkyl group having up to 4 carbon atoms, such as methyl, ethyl, n-propyl, isopropyl, n-butyl, and the like. By aryl is meant phenyl, naphthyl, biphenyl or an aryl group substituted with a lower alkyl group, halogen or a lower alkoxy group. The lower alkyl group has 1 to 4 carbon atoms.

The dianhydrides of the invention are prepared by reacting a dihalo triazine such as 2-phenyl-4,6-dichloro-s-triazine, with 2 moles of o-xylene in the presence of aluminum chloride which yields a bis-(o-dimethylphenyl)-s-triazine. This intermediate is oxidized using conventional oxidizing reagents such as potassium permanganate to yield the corresponding tetracarboxylic compounds which, upon heating, yields the dianhydride. The preparation of bis(o-dimethylphenyl)-s-triazine compounds is described in greater detail in the copending application filed on the same day as the instant application (Ser. No. 248,839, filed May 1, 1972).

The oxidation of bis-(o-dimethylphenyl)-s-triazine intermediate to the tetracarboxylic acid derivative can be accomplished by treating the alkyl derivative with oxidizing agents such as potassium permanganate, chromium oxide, nitric acid, air oxidation or other conventional methods. The tetraacid is dehydrated by conventional methods such, for example, refluxing in nitrobenzene, refluxing in acetic anhydride or heating the acid in the solid state and removing water by vacuum.

The s-triazine dianhydrides of this invention can be used in the same manner as prior art dianhydrides such as benzophenonetetracarboxylic dianhydride or pyromellitic dianhydride. Thus, the s-triazine dianhydride can be reacted with a diamino compound to give the polyamide acid which, upon curing, yields a polyimide. The preparation of polyimides employing the dianhydrides of this invention are described in greater detail in an application filed on the same day as the instant application (Ser. No. 248,837, filed May 1, 1972). The instant dianhydride will also undergo a condensation reaction with orthoaromatic tetraamines to yield polybenzoalene, benzimidazoles or polyimidazopyrrolones. By condensing the dianhydrides of this invention with bis-o-amino amides heterocyclic polymers known as polyisoendoquinozolenediones can be prepared.

To illustrate further the invention described above, the following examples are presented for illustrative purposes only.

EXAMPLE 1

Preparation of 2-phenyl-4,6-bis-(3',4'-dicarboxyphenyl)-s-triazine dianhydride

To a mixture of 36.5 g (0.10 moles) of 2-phenyl-4,6-bis-(3',4'-dimethylphenyl)-s-triazine, 750 ml of pyridine and 450 ml of water at reflux was added, in portions, 790 g (5.0 moles) of potassium permanganate over a 4 hour period. The rate of the KMnO$_4$ addition was adjusted to keep the mixture at reflux, and 1200 ml of water was added to control the rate of reflux and keep the mixture fluid. After the addition was complete, the reaction was refluxed for 2 hours and then cooled to room temperature. The mixture was filtered, and the residue washed with water. The filtrate and water washings were combined and acidified to pH 1 with conc. HCl. The resulting solid was filtered, washed with water and acetonitrile to give 23.0 g of 2-phenyl-4,6-bis-(3',4'-dicarboxyphenyl)-s-triazine, m.p. 386°-397°.

The tetraacid was refluxed in 500 ml of nitrobenzene. The water of dehydration was removed using a Dean Stark trap. The hot nitrobenzene solution was filtered. On cooling, 14.3 g of the dianhydride crystallized, m.p. 401°-406°.

Analysis for $C_{25}H_{11}N_3O_6$:

Calculated: C, 66.82; H, 2.47; N, 9.35;
Found: C, 66.77; H, 2.74; N, 9.47.

EXAMPLE 2

Preparation of 2-diphenylamino-4,6-bis-(3',4'-dicarboxyphenyl)-s-triazine dianhydride Using 45.6 g (0.10 mole) of 2-diphenylamino-4,6-bis-(3',4'-dimethylphenyl)-s-triazine and the procedure described in Example 1, 36.0 g of 2-diphenylamino-4,6-bis-(3',4'-dicarboxyphenyl)-s-triazine was obtained, m.p. 345°–352°.

The tetraacid was dehydrated to give 26.9 g (50 percent) of the dianhydride, m.p. 354°–357°.

Analysis for $C_{31}H_{16}N_4O_6$:
Calculated: C, 68.89; H, 2.95; N, 10.37;
Found: C, 68.43; H, 3.11; N, 10.37.

EXAMPLE 3

Preparation of 2-carboxyl-4,6-bis-(3',4'-dicarboxyphenyl)-s-triazine dianhydride Following the procedure of Example 1, 2-methyl-4,6-bis-(3',4'-dimethylphenyl)-s-triazine is oxidized to give 2-carboxyl-4,6-bis-(3',4'-dicarboxyphenyl)-s-triazine which, upon dehydration, yields the corresponding dianhydride.

EXAMPLE 4

Preparation of 2-p-biphenylyl-4,6-bis-(3',4'-dicarboxyphenyl)-s-triazine dianhydride Following the procedure of Example 1, 2-p-biphenylyl-4,6-(3',4'-dimethylphenyl)-s-triazine is oxidized to give 2-p-biphenylyl-4,6-bis-(3',4'-dicarboxyphenyl)-s-traizine which, upon dehydration, yields the corresponding dianhydride.

EXAMPLE 5

Preparation of 2-(9-carbazolyl)-4,6-bis-(3',4'-dicarboxyphenyl)-s-triazine dianhydride Following the procedure of Example 1, 2-(9-carbazolyl)-4,6-bis-(3',4'-dimethylphenyl)-s-triazine is oxidized. After dehydration the above named product is obtained.

What is claimed is:

1. An s-triazine dianhydride having the formula

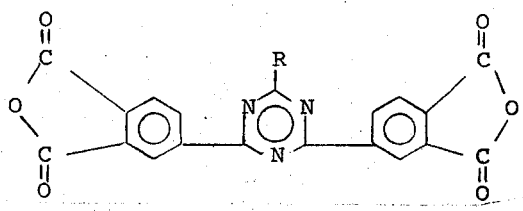

wherein
R is hydrogen, a straight or branched chain alkyl group having up to 4 carbon atoms, carboxyl, amino, phenyl, naphthyl, biphenyl or one of such aryl groups substituted with a lower alkyl group, a lower alkoxy group, a carboxy group, or up to 2 halogen atoms, diphenylamino, dinapthylamino or a heterocyclic group selected from (a) 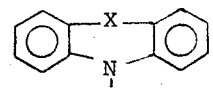

wherein X is oxygen, sulfur or a covalent bond, (b) 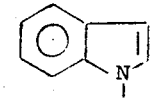

(c) 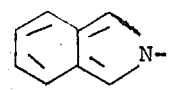

(d) 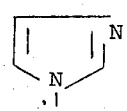 , and (e) 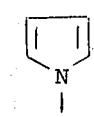

2. The compound of claim 1 wherein R is phenyl group.
3. The compound of claim 1 wherein R is diphenylamino group.
4. The compound of claim 1 wherein R is carboxyl group.
5. The compound of claim 1 wherein R is p-biphenylyl group.
6. An s-triazine tetracarboxylic acid having the formula

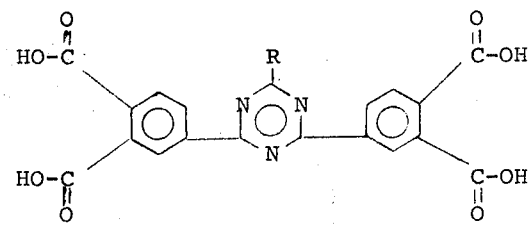

wherein
R is hydrogen, a straight or branched chain alkyl group having up to 4 carbon atoms, carboxyl, amino, phenyl, naphthyl, biphenyl or one of such aryl groups substituted with a lower alkyl group, a lower alkoxy group, a carboxy group, or up to 2 halogen atoms, diphenylamino, dinaphthylamino or a heterocyclic group selected from (a) 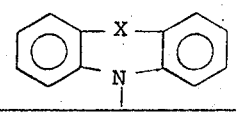

wherein X is oxygen, sulfur or a covalent bond, (b) 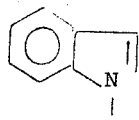
(c) 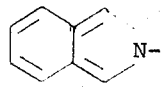
(d) 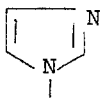, and
(e) 
7. The compound of claim 6 wherein R is phenyl group.
8. The compound of claim 6 wherein R is diphenylamino group.
9. The compound of claim 6 wherein R is carboxyl group.
10. The compound of claim 6 wherein R is p-biphenylyl group.
* * * * *